United States Patent
Mitani

(10) Patent No.: US 9,756,238 B2
(45) Date of Patent: Sep. 5, 2017

(54) IMAGE CAPTURING APPARATUS FOR PERFORMING AUTHENTICATION OF A PHOTOGRAPHER AND ORGANIZING IMAGE DATA FOR EACH PHOTOGRAPHER AND CONTROL METHOD THEREOF

(71) Applicant: CANON KABUSHIKI KAISHA, Tokyo (JP)

(72) Inventor: Shigeyuki Mitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 220 days.

(21) Appl. No.: 14/270,010

(22) Filed: May 5, 2014

(65) Prior Publication Data

US 2014/0333792 A1    Nov. 13, 2014

(30) Foreign Application Priority Data

May 10, 2013  (JP) ................. 2013-100705

(51) Int. Cl.
| | | |
|---|---|---|
| *H04N 5/232* | (2006.01) | |
| *G06K 9/62* | (2006.01) | |
| *G06K 9/68* | (2006.01) | |
| *G06K 9/00* | (2006.01) | |
| *H04N 5/225* | (2006.01) | |

(52) U.S. Cl.
CPC ....... *H04N 5/23219* (2013.01); *G06K 9/6255* (2013.01); *G06K 9/6807* (2013.01); *G06K 9/00288* (2013.01); *G06K 2009/00328* (2013.01); *H04N 5/2258* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,006,671 | B2* | 2/2006 | Yamaguchi | ........ G06K 9/00288 340/5.53 |
| 9,055,276 | B2* | 6/2015 | Parulski | ................. H04N 5/232 |
| 2001/0026634 | A1* | 10/2001 | Yamaguchi | ........ G06K 9/00288 382/118 |
| 2007/0140532 | A1* | 6/2007 | Goffin | ................ G06K 9/00288 382/118 |
| 2010/0045787 | A1* | 2/2010 | Uno | ..................... G06K 9/6807 348/77 |

(Continued)

FOREIGN PATENT DOCUMENTS

JP    2009-290260 A    12/2009

*Primary Examiner* — Twyler Haskins
*Assistant Examiner* — Akshay Trehan

(57) ABSTRACT

An image capturing apparatus, comprises an image capturing unit configured to capture an image; a detection unit configured to detect an object in a captured image; a first authentication unit configured to perform authentication on a photographer using first dictionary data in which feature information of the photographer is registered; a second authentication unit configured to perform authentication on the object in the captured image using second dictionary data in which feature information of the object is registered for each photographer; and a switching unit configured to switch the second dictionary data to be used by the second authentication unit in accordance with the photographer authenticated by the first authentication unit.

10 Claims, 17 Drawing Sheets

(56) References Cited

U.S. PATENT DOCUMENTS

| | | | |
|---|---|---|---|
| 2010/0119155 A1* | 5/2010 | Kurahashi | G06K 9/00221 382/190 |
| 2010/0142762 A1* | 6/2010 | Morita | G06F 17/30259 382/115 |
| 2012/0066309 A1* | 3/2012 | Yuki | G06F 17/30265 709/204 |
| 2012/0307096 A1* | 12/2012 | Ford | H04N 5/23219 348/222.1 |
| 2013/0050461 A1* | 2/2013 | Wada | G06K 9/00288 348/77 |
| 2013/0070115 A1* | 3/2013 | Yang | G06K 9/00221 348/222.1 |
| 2014/0146204 A1* | 5/2014 | Boss | H04N 5/23229 348/239 |
| 2014/0330729 A1* | 11/2014 | Colangelo | G06Q 20/40145 705/72 |

* cited by examiner

| ID | FEATURE AMOUNT | DICTIONARY FOR PHOTOGRAPHER X | DICTIONARY FOR PHOTOGRAPHER Y | DICTIONARY FOR PHOTOGRAPHER Z |
|---|---|---|---|---|
| 1 | DATA-a | A | A | UNREGISTERED |
| 2 | DATA-b | B | UNREGISTERED | MR. B |
| 3 | DATA-c | C | C | UNREGISTERED |
| 4 | DATA-d | D | UNREGISTERED | BROTHER |

F I G. 6
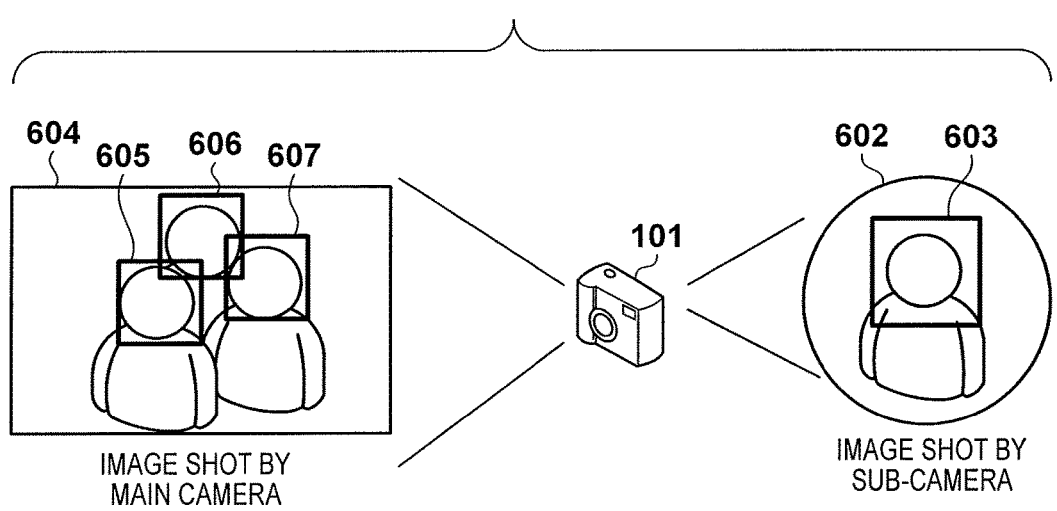

F I G. 16
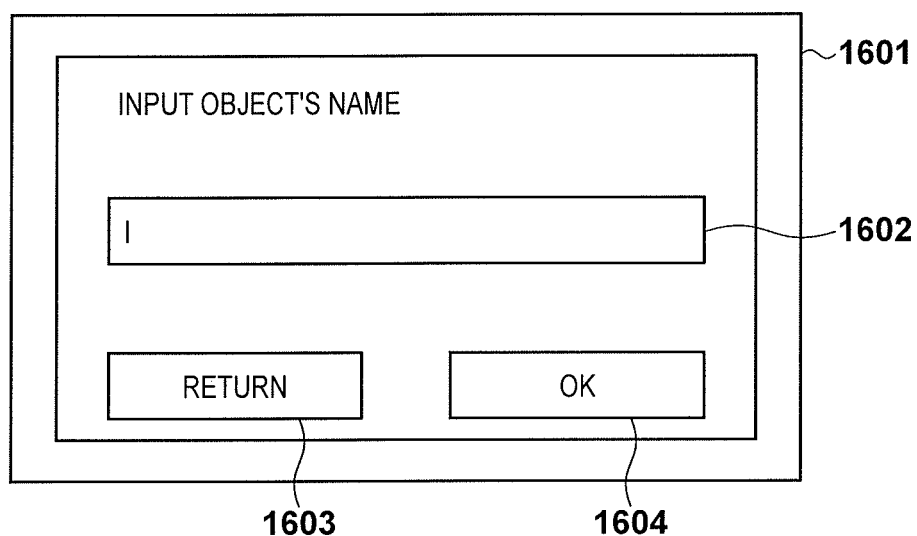

F I G. 20

| ID (2002) | FEATURE AMOUNT (2003) | DICTIONARY FOR PHOTOGRAPHER X (2004) |
|---|---|---|
| 1 | DATA-a | A |
| 2 | DATA-b | B |
| 3 | DATA-c | C |
| 4 | DATA-d | D |

(2001)

IMAGE CAPTURING APPARATUS FOR PERFORMING AUTHENTICATION OF A PHOTOGRAPHER AND ORGANIZING IMAGE DATA FOR EACH PHOTOGRAPHER AND CONTROL METHOD THEREOF

BACKGROUND OF THE INVENTION

Field of the Invention

The present invention relates to an image capturing apparatus having a function of performing authentication on an object and a photographer.

Description of the Related Art

Some recent image capturing apparatuses such as digital cameras have functions of performing authentication on specific objects, including a face recognition function and a face dictionary function. The face recognition function, which is for identifying a face area of a person from a captured image, is applied to functions including a function of determining whether a person is included in an object and a function of automatically focusing on a person, and is used for enabling a photographer to comfortably perform shooting. The face dictionary function is for identifying a person by extracting a feature amount of a person's face recognized with the face recognition function and comparing the extracted feature amount with a feature amount of a pre-registered person, and is applied to organization of image data after shooting and a search for the image data.

As a technique applying these functions, for example, Japanese Patent Laid-Open No. 2009-290260 recites a technique using a sub-camera for shooting an object located on the photographer side, by which the photographer in an image that is shot by the sub-camera is recognized and a camera setting is automatically switched in accordance with a change of the photographer.

For example, if a camera equipped with the face dictionary function is shared by a plurality of users, even a photographer who is a stranger will be authenticated as a specific object if this photographer is registered in the face dictionary. Moreover, if there is a photographer having a similar feature amount of the face, it is possible that this photographer will be misidentified as a completely unknown person.

Furthermore, although an appropriate shooting environment can be provided for each photographer with the technique recited in Japanese Patent Laid-Open No. 2009-290260, this technique is not useful for organization or selection of image data after shooting.

SUMMARY OF THE INVENTION

The present invention has been made in consideration of the aforementioned problems.

In order to solve the aforementioned problems, the present invention provides an image capturing apparatus, comprising: an image capturing unit configured to capture an image; a detection unit configured to detect an object in a captured image; a first authentication unit configured to perform authentication on a photographer using first dictionary data in which feature information of the photographer is registered; a second authentication unit configured to perform authentication on the object in the captured image using second dictionary data in which feature information of the object is registered for each photographer; and a switching unit configured to switch the second dictionary data to be used by the second authentication unit in accordance with the photographer authenticated by the first authentication unit.

In order to solve the aforementioned problems, the present invention provides a control method of an image capturing apparatus, comprising: a detection step of detecting an object in a captured image; a first authentication step of performing authentication on a photographer using first dictionary data in which feature information of the photographer is registered; a second authentication step of performing authentication on the object in the captured image using second dictionary data in which feature information of the object is registered for each photographer; and a switching step of switching the second dictionary data to be used in the second authentication step in accordance with the photographer authenticated in the first authentication step.

According to the present invention, execution of unnecessary object authentication for a photographer who is a stranger can be suppressed, and misidentification of a photographer having a similar feature amount of the face as a completely unknown person can also be suppressed.

Furthermore, image data can be organized and selected for each photographer using a person's name.

Further features of the present invention will become apparent from the following description of exemplary embodiments (with reference to the attached drawings).

BRIEF DESCRIPTION OF THE DRAWINGS

FIG. 6 is a diagram illustrating a shooting operation using a main camera and a sub-camera of the image capturing apparatus in the present embodiment.

FIG. 16 is a diagram showing an exemplary UI screen for allowing a photographer to register his/her own information in a face dictionary in an image capturing apparatus in a fifth embodiment.

FIG. 20 is a diagram showing a data format of a face dictionary for each photographer in the image capturing apparatus in the sixth embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

Hereinafter, an embodiment will be described in which the present invention is applied to a digital camera or the like having a face recognition function and a face dictionary function, for example, but the present invention is not limited thereto. The present invention can also be applied to information processing apparatuses such as mobile phones, portable media players, so-called tablet devices, and personal computers, for example.

Apparatus Configuration

An outline of a configuration and functions of an image capturing apparatus in the present embodiment will now be described with reference to FIG. 1.

Figure 1:
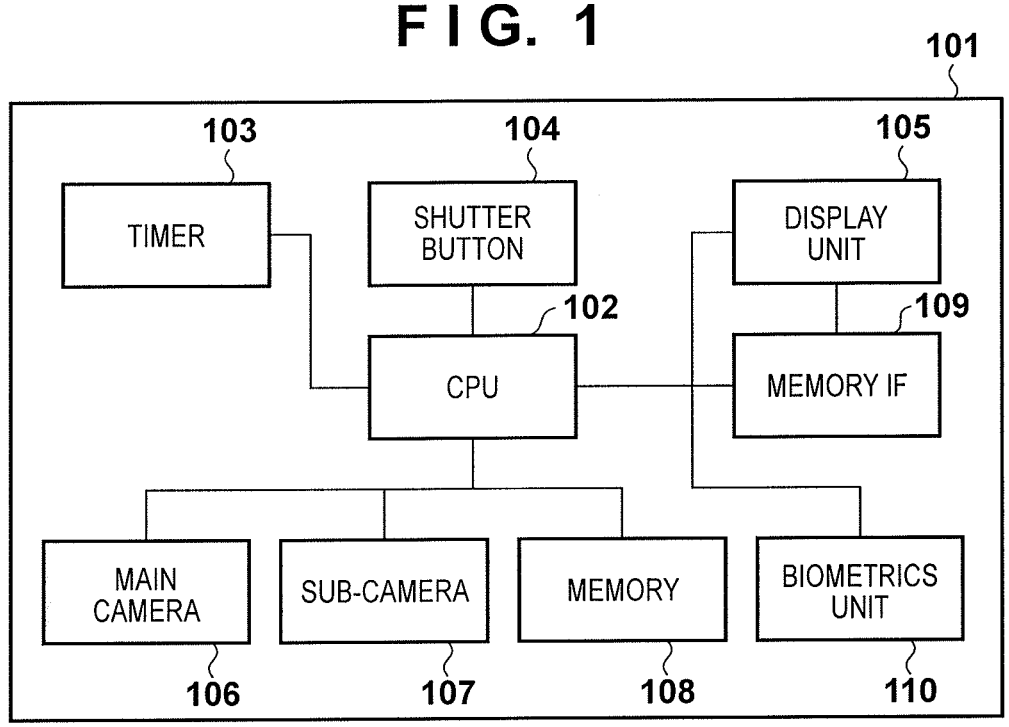
FIG. 1 is a block diagram showing a configuration of an image capturing apparatus in the present embodiment.

In an image capturing apparatus 101 shown in FIG. 1, a CPU 102 is a control unit for controlling the overall apparatus and performing various kinds of information processing. A timer 103 is a timer for recording shooting date and time of an image. A shutter button 104 is an operation unit for giving a shooting instruction. A display unit 105 is an LCD screen or the like for displaying an object at the time of shooting and reproducing an image after shooting, and is capable of accepting a user input operation via a touch panel. A main camera 106 is a camera module which performs shooting of the object side. A sub-camera 107 is a camera module which performs shooting of an object on the photographer side. A memory 108 temporarily holds data of images shot by the aforementioned camera modules. A memory interface 109 can access a recording medium, such as a memory card, that is attached to the apparatus body, and stores shot image data and the like. A biometrics unit 110 is, for example, a fingerprint sensor, a microphone for voice recognition processing, a finder camera for iris pattern determination, or the like, and is used for reading biological information used for performing authentication on a photographer.

Object Authentication Module

Next, a configuration of a software module by which the image capturing apparatus in the present embodiment realizes a face recognition function and a face dictionary function will be described with reference to FIG. 2.

Figure 2:
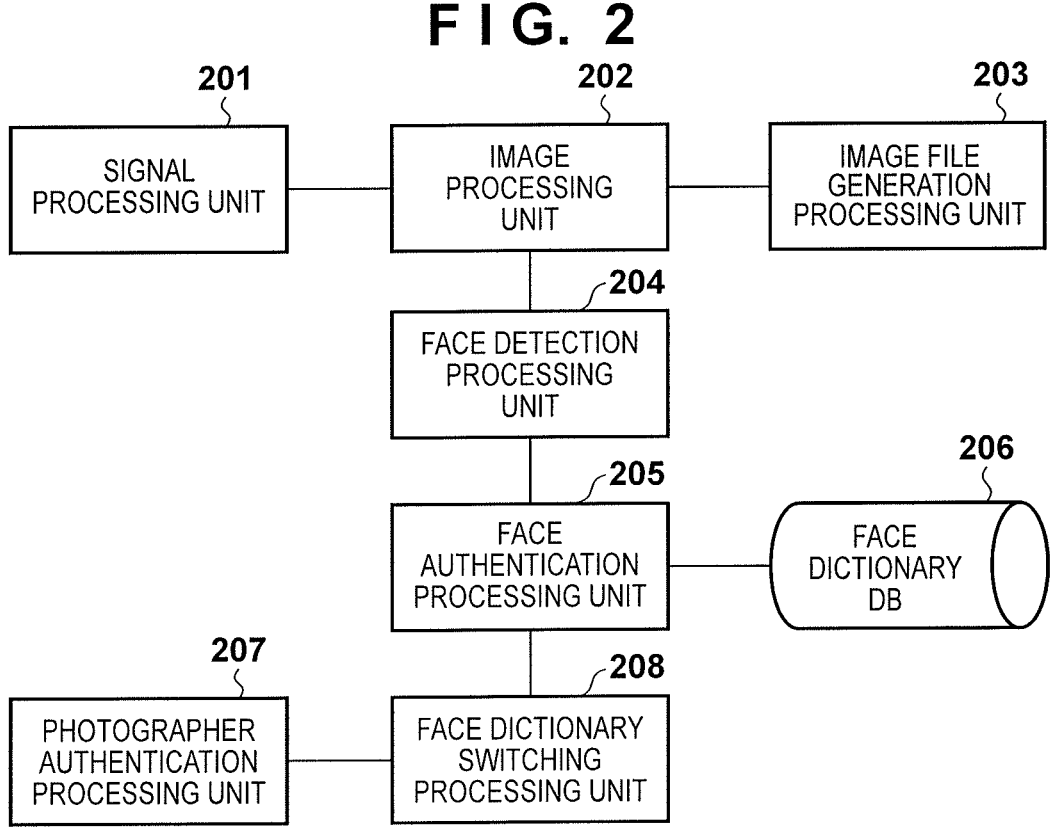
FIG. 2 is a functional block diagram for realizing a face recognition function and a face dictionary function in the present embodiment.

In FIG. 2, a signal processing unit 201 converts optical images received by the main camera 106 and the sub-camera 107 into electric signals. The electric signals obtained as a result of photoelectric conversion by the signal processing unit 201 are converted into digital information that can be handled as image data by an image processing unit 202.

The image data generated by the image processing unit 202 is converted into an image file in a format to be stored in a computer or the like by an image file generation processing unit 203, and is recorded in the memory 108.

A face detection processing unit 204 searches for a portion that can be recognized as a person's face in the image data generated by the image processing unit 202. A facial authentication processing unit 205, references a face dictionary database (DB) 206 in which feature information (hereinafter referred to as "feature amount") of a person's face is registered, thereby performs authentication of the name of the person corresponding to the face recognized by the face detection processing unit 204, and presents an authentication result.

A face dictionary DB 206 is a set of data loaded into the memory 108 and the feature amount of a person's face recognized by the face detection processing unit 204 is registered therein in association with a person's name.

The above is the configuration of the software module having a general object authentication function, and in the present embodiment, a photographer authentication processing unit 207 and a face dictionary switching processing unit 208 are additionally provided.

The photographer authentication processing unit 207, analyzes the feature amount of the face of a photographer based on the image shot by the sub-camera 107, and identifies the photographer by referencing the face dictionary DB 206, for example. Here, the methods for identifying the photographer also include, for example, determination using information that is directly input by the photographer via a touch panel or the like, or biological information that is input in the biometrics unit 110, in addition to the aforementioned method.

The face dictionary switching processing unit 208 switches the face dictionary DB 206 that is to be referenced by the facial authentication processing unit 205, in accordance with the photographer identified by the photographer authentication processing unit 207.

Configuration of Face Dictionary DB

Next, a configuration of a face dictionary for each photographer managed in the face dictionary DB 206 in the present embodiment will be described with reference to FIG. 3.

Figures 3, 4:
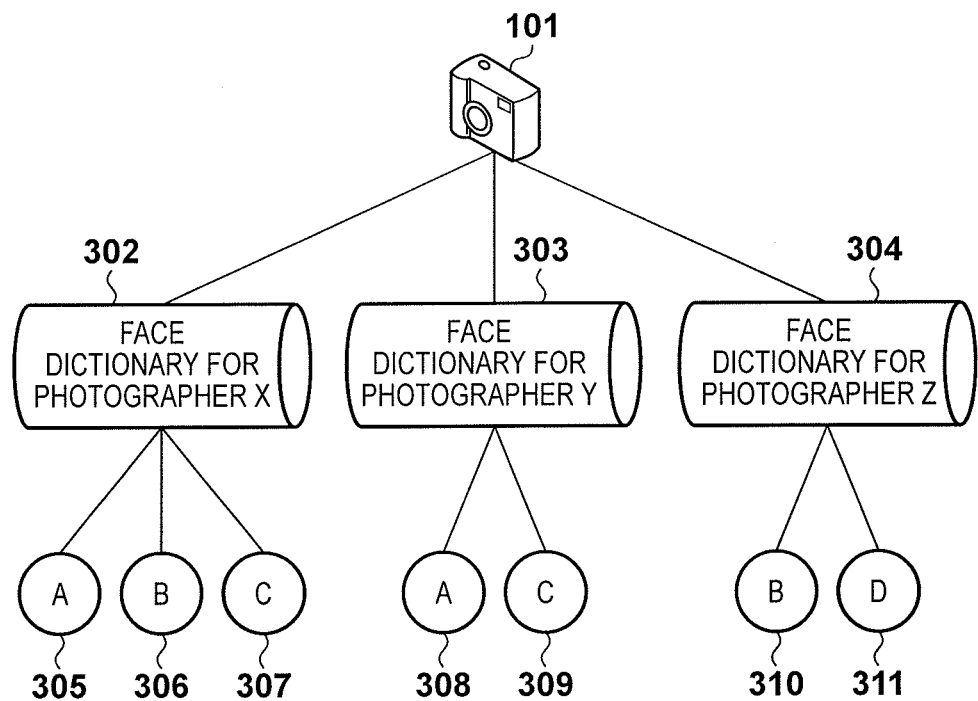
FIG. 3 is a diagram showing a configuration of a face dictionary database in the present embodiment.
FIG. 4 is a diagram showing a data format of face dictionaries in a face dictionary database in the present embodiment.

In FIG. 3, in the face dictionary DB in the image capturing apparatus 101, a face dictionary 302 for a photographer X, a face dictionary 303 for a photographer Y, and a face dictionary 304 for a photographer Z are prepared in association with the respective photographers.

In the face dictionaries 302, 303, and 304 for the respective photographers, feature amounts of different objects are registered. That is to say, the face dictionary 302 for the photographer X holds the feature amounts of an object A (305), an object B (306), and an object C (307). The face dictionary 303 for the photographer Y holds the feature amounts of the object A (308) and the object C (309). The face dictionary 304 for the photographer Z holds the feature amounts of the object B (310) and the object D (311).

The face dictionaries 302 to 304 for the respective photographers are switched by the face dictionary switching processing unit 208 and referenced by the facial authentication processing unit 205, in accordance with the photographer authenticated by the photographer authentication processing unit 207.

Data Format of Face Dictionary

Next, a data format of the face dictionaries held in the face dictionary DB 206 in the present embodiment will be described with reference to FIG. 4.

In FIG. 4, reference numeral 401 denotes the face dictionary DB, and reference numeral 402 denotes ID numbers for management on a program that are not to be shown to photographers, and each ID number indicates a unit of a person (object) based on the association between the feature amount of the face of the object, which will be described later, and the name registered in the face dictionary. Reference numeral 403 denotes information extracted as the feature amount of the face, and is used to identify a person by comparing this information with the feature amounts of people who are objects. Reference numerals 404, 405, and 406 are registered name tables constituted by names (registered names) that are uniquely assigned to the respective people managed in the face dictionary DB 206, and a table is prepared for each photographer. The photographer can input a character string of a name by operating the touch panel on the display unit 105.

Upon the face dictionary (photographer) being switched by the face dictionary switching processing unit 208, the registered name table for a target photographer is loaded into the memory 108 again and referenced by the facial authentication processing unit 205.

Facial Authentication Processing

Next, facial authentication processing performed by the image capturing apparatus with respect to a photographer and an object in the present embodiment will be described with reference to FIG. 5. Note that this processing is realized as a result of a program recorded in a nonvolatile memory such as a ROM being deployed to the memory 108 and executed by the CPU 102.

Figure 5:
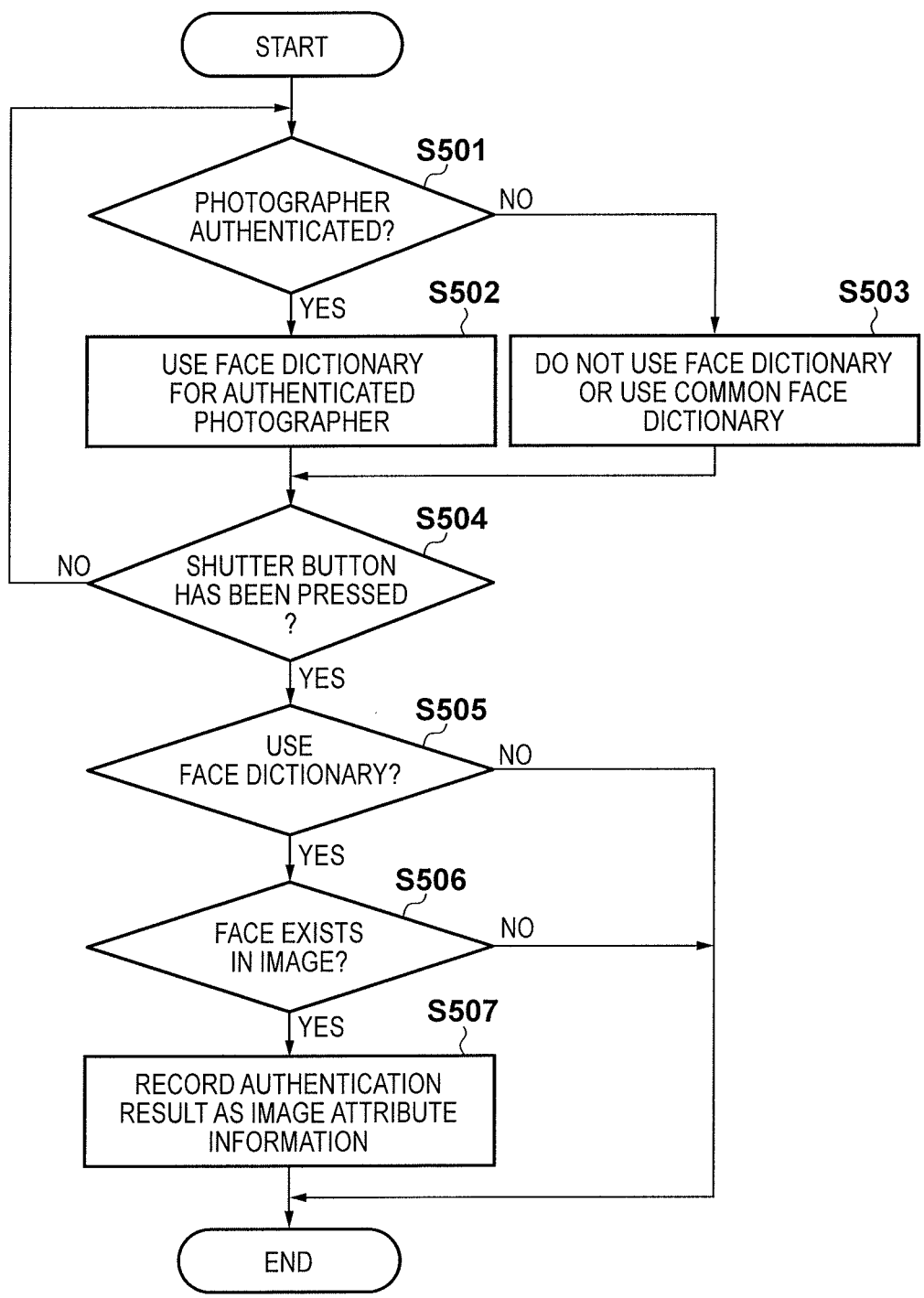
FIG. 5 is a flowchart showing facial authentication processing performed by the image capturing apparatus with respect to a photographer and an object in the present embodiment.

In FIG. 5, in step S501, the CPU 102 performs authentication processing with respect to the photographer with the photographer authentication processing unit 207, advances the processing to step S502 if the photographer is authenticated, and advances the processing to step S503 if not.

In step S502, the face dictionary for the photographer authenticated by the face dictionary switching processing unit 208 is loaded from the face dictionary DB 206 into the memory 108, and the CPU 102 can reference the face dictionary at the facial authentication processing unit 205.

On the other hand, in step S503, the CPU 102 causes a common face dictionary that does not identify a photographer to be loaded into the memory 108 or causes a face dictionary not to be loaded (i.e., not to be used), and it is determined whether the common face dictionary is loaded or a face dictionary is not loaded, in accordance with the initial settings of the program.

In step S504, the CPU 102 determines whether or not the shutter button 104 has been pressed and shooting processing has been performed, advances the processing to step S505 if the shutter button 104 has been pressed, and returns to step S501 if not.

In step S505, the CPU 102 determines whether a face dictionary has been loaded into the memory 108 and can be referenced, advances the processing to step S506 if the face dictionary can be referenced, and ends the processing if not.

In step S506, the CPU 102 analyzes captured image data (through-the-lens image data) with the face detection processing unit 204, advances the processing to step S507 if it is recognized that a face exists in the image, and ends the processing if not.

In step S507, the CPU 102 references the face dictionary with the facial authentication processing unit 205, performs authentication of the name of the person having the face recognized at the face detection processing unit 204, and records an authentication result as image attribute information. Here, the image attribute information includes a photographer's name and an object's name registered in the face dictionary for the photographer.

Note that a configuration may also be employed in which a frame is displayed so as to surround the face of an object and the name of the object is displayed in the vicinity of the frame when an image is reproduced, based on the attribute information recorded in step S507. Furthermore, before the shutter button is pressed, the aforementioned facial authentication processing may be performed on a through-the-lens image such that the frame and the name are displayed as mentioned above.

As described above, control is performed such that the face dictionary corresponding to the photographer at the time of shooting is referenced.

Facial Authentication Processing

Next, facial authentication processing performed by the image capturing apparatus with respect to a photographer and an object in the present embodiment will be described with reference to FIGS. 6 to 8.

In FIG. 6, reference numeral 602 denotes an image shot by the sub-camera 107 (hereinafter referred to as a "sub-camera image"), and a frame 603 is displayed around the face of the photographer detected by the face detection processing unit 204. Reference numeral 604 denotes an image shot by the main camera 106 (hereinafter referred to as a "main camera image"), and frames 605 to 607 are displayed around the faces of a plurality of objects detected by the face detection processing unit 204.

Upon the photographer's face being detected in the sub-camera image 602 by the face detection processing unit 204, the photographer authentication processing unit 207 performs authentication processing with respect to the photographer, the face dictionary switching processing unit 208 switches the face dictionary to the face dictionary for the authenticated photographer, which is loaded into the memory 108. Then, the facial authentication processing unit 205 references the face dictionary loaded into the memory 108, and performs facial authentication processing with respect to the objects existing in the main camera image 604.

Note that, as described above, a configuration may also be employed in which the names of the objects are displayed in the vicinity of the frames 605 to 607 of the objects' faces in the main camera image 604, based on the result of the aforementioned facial authentication processing with respect to the objects. Furthermore, the aforementioned facial authentication processing may be performed on a through-the-lens image before the shutter button is pressed such that the frames and the names are displayed as mentioned above. Moreover, a configuration may also be employed in which the sub-camera image 602 is displayed in a portion of the main camera image 604, and the photographer's name is displayed in the vicinity of the frame 603 of the photographer's name in the sub-camera image 602 based on the result of the aforementioned facial authentication processing with respect to the photographer.

Figure 7:
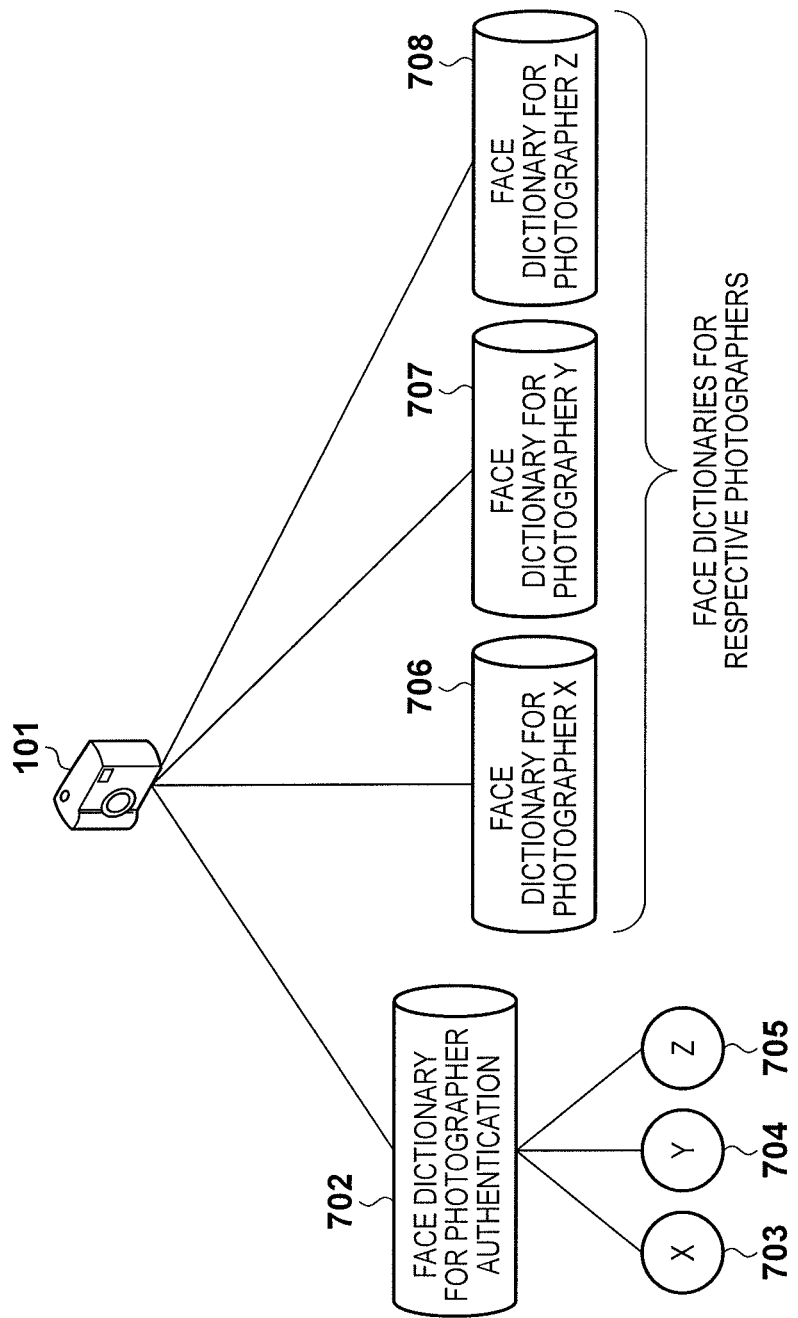
FIG. 7 is a diagram illustrating facial authentication processing performed by the image capturing apparatus with respect to a photographer and an object in the present embodiment.

FIG. 7 shows an exemplary configuration of the face dictionaries used in the facial authentication processing in the present embodiment.

In FIG. 7, as in FIG. 3, the prepared face dictionaries for the respective photographers that serve as second dictionary data include a face dictionary 706 for a photographer X, a face dictionary 707 for a photographer Y, and a face dictionary 708 for a photographer Z. Furthermore, in FIG. 7, a face dictionary 702 for photographer authentication that serves as first dictionary data is prepared, and feature amounts 703, 704, and 705 of the faces of the photographers X, Y, and Z who are registered in the face dictionaries for the photographers are registered.

The face dictionaries 706 to 708 for the respective photographers are managed independently of the photographers and loaded into the memory 108 so as to be able to be referenced in common by any photographer.

Figure 8:
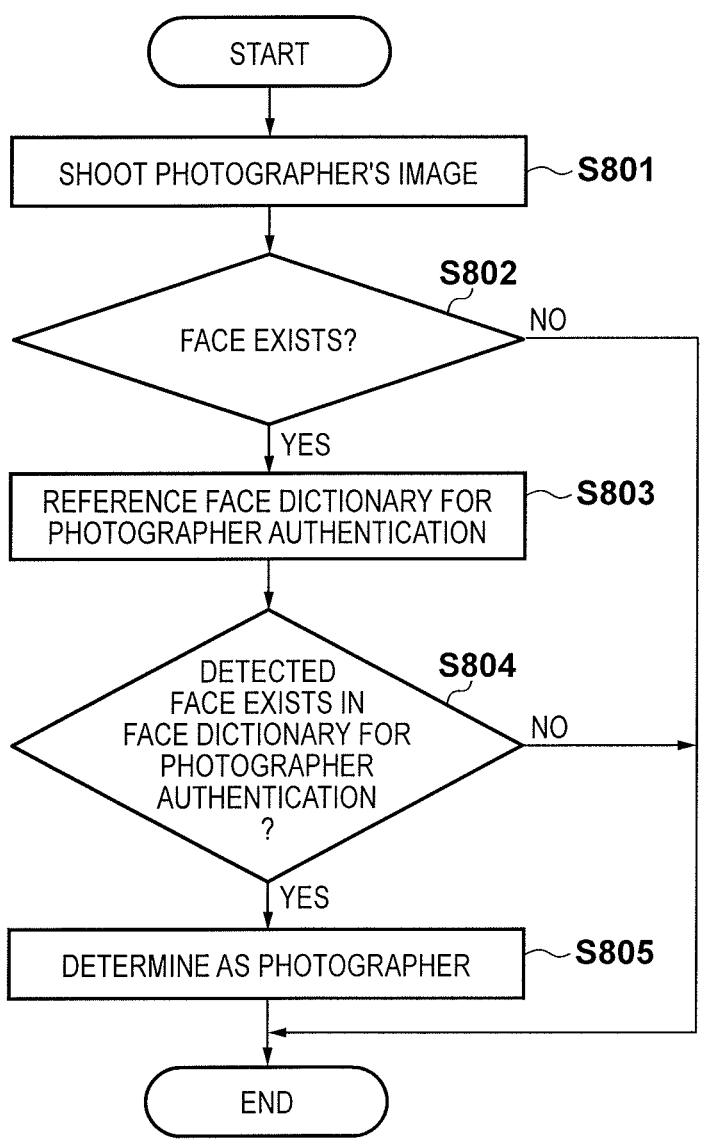
FIG. 8 is a flowchart showing facial authentication processing performed by the image capturing apparatus with respect to a photographer in the present embodiment.

FIG. 8 is a flowchart showing facial authentication processing with respect to the photographer in step S501 in FIG. 5.

In FIG. 8, in step S801, the CPU 102 shoots an image with the sub-camera 107.

In step S802, the CPU 102 determines whether or not a face portion exists in the sub-camera image 602, using the face detection processing unit 204. If it is determined in step S802 that the face portion exists, the processing proceeds to step S803, and if it is determined that a face portion does not exist, the processing ends.

In step S803, the CPU 102 references the face dictionary 702 for photographer authentication with the facial authentication processing unit 205.

In step S804, the CPU 102 causes the photographer authentication processing unit 207 to determine whether or not the face recognized by the face detection processing unit 204 is registered in the face dictionary for photographer authentication, and advances the processing to step S805 if the face is registered, and if not, the CPU 102 does not update the photographer and ends the processing ends.

In step S805, the CPU 102 records the person authenticated by the photographer authentication processing unit 207 as a program variable in the memory 108 such that the authenticated person can be used as a photographer in later processing.

Second Embodiment

Next, authentication processing performed by an image capturing apparatus with respect to a photographer in a second embodiment will be described.

In the present embodiment, authentication processing is performed with respect to a photographer using a fingerprint sensor in the biometrics unit 110.

Figure 9:
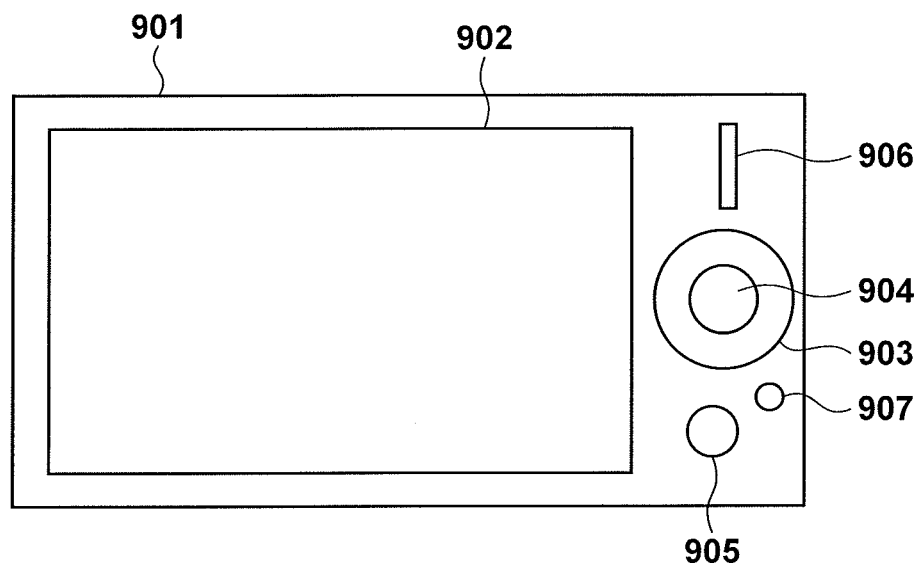
FIG. 9 is an outline drawing showing a configuration of an image capturing apparatus in a second embodiment.

FIG. 9 is an outline drawing of a back face of the image capturing apparatus in the second embodiment.

In FIG. 9, a liquid crystal panel 902 serving as the display unit 105 is disposed on a back face 901 of the apparatus body. The liquid crystal panel 902 is used for, for example, display of an image shot by the main camera 106, display of an operation screen for camera settings or the like, and display of image data stored in a memory card or the like. A ring-shaped four-direction button 903, a determination button 904, a cancel button 905, a fingerprint sensor 906, and a menu button 907 are disposed in the vicinity of the liquid crystal panel 902. With the four-direction button 903, the user can input various instructions to control the operation screen displayed on the liquid crystal panel 902, to change the display screen, and the like, by pressing down the four-direction button 903 in up-and-down and left-and-right directions. By pressing down the determination button 904, the user can input selection of an item on the operation screen displayed on the liquid crystal panel 902 and an instruction. By pressing down the cancel button 905, the user can input an instruction to cancel an item on the operation screen displayed on the liquid crystal panel 902. The fingerprint sensor 906 can read a fingerprint as a result of a pad of a photographer's finger sliding thereon. By pressing down the menu button 907, the user can display a camera setting menu for image shooting and reproduction on the liquid crystal panel 902.

With the configuration in FIG. 9, when the photographer operates the apparatus, the photographer can be subjected to authentication by causing the fingerprint sensor 906 to read the photographer's fingerprint.

Figure 10:
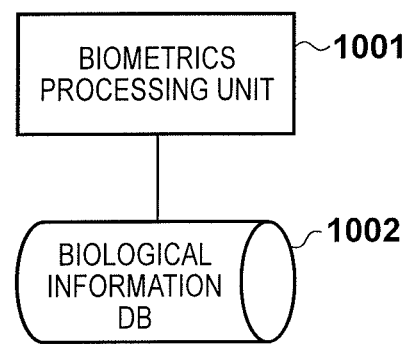
FIG. 10 is a functional block diagram for realizing authentication processing performed by the image capturing apparatus with respect to a photographer in the second embodiment.

FIG. 10 shows a configuration of a software module of a photographer authentication processing unit in the image capturing apparatus in the second embodiment, corresponding to the photographer authentication processing unit 207 in FIG. 2.

In FIG. 10, a biometrics processing unit 1001 identifies a photographer by referencing a biological information DB 1002 regarding biological information including the fingerprint that is read by the fingerprint sensor 906. In the biological information DB 1002, biological information for all photographers registered in the apparatus is registered. The biological information DB 1002 is deployed to the memory 108 so as to be able to be referenced by the biometrics processing unit 1001, and a person who matches the biological information that is input from the biometrics unit 110 is recorded as a program variable in the memory 108 so as to be able to be used as a photographer in later processing.

Although the present embodiment describes an example of using a fingerprint as biological information, any other kind of information by which a person can be identified, such as a vein pattern, an iris pattern, and a voice print, may also be used, and the biometrics unit 110 and the biological information DB 1002 that are appropriate for the biological information to be used will be prepared.

Figure 11:
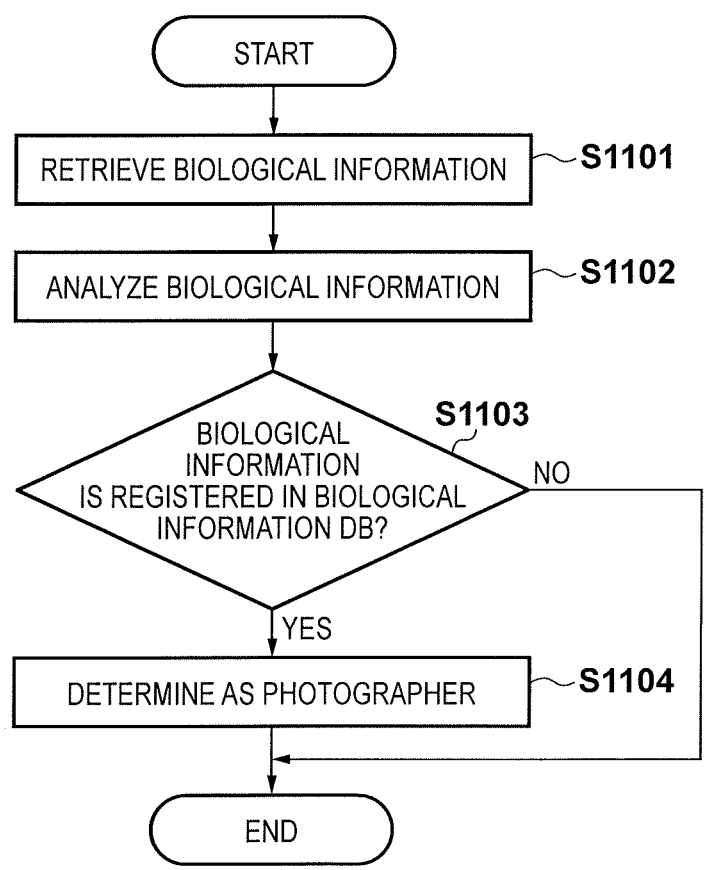
FIG. 11 is a flowchart showing authentication processing performed by the image capturing apparatus with respect to a photographer in the second embodiment.

FIG. 11 is a flowchart showing authentication processing with respect to the photographer in step S501 in FIG. 5.

In FIG. 11, in step S1101, the CPU 102 reads biological information using the fingerprint sensor 906 serving as the biometrics unit 110.

In step S1102, the CPU 102 analyzes the read biological information using the biometrics processing unit 1001.

In step S1103, the CPU 102 determines whether or not the analyzed biological information is registered in the biological information DB 1002, advances the processing to step S1104 if the analyzed biological information is registered, and if not, the CPU 102 does not update the photographer and ends the processing.

In step S1104, the CPU 102 records a person who matches the biological information registered in the biological information DB 1002 as a program variable in the memory 108 so as to be able to be used as a photographer in later processing.

Other configurations of the present embodiment are similar to those of the first embodiment, and the description thereof will be omitted.

Third Embodiment

Next, face dictionary selection processing performed by the image capturing apparatus with respect to a photographer in a third embodiment will be described.

In the present embodiment, processing for selecting a face dictionary for a photographer is performed by the photographer inputting a predetermined operation.

Figure 12:
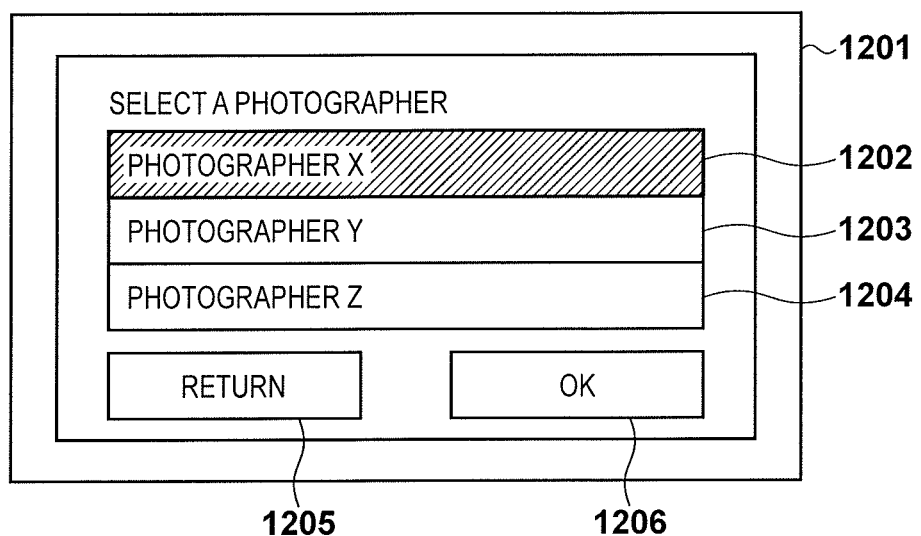
FIG. 12 is a diagram showing an exemplary UI screen for allowing a user to designate a specific photographer in an image capturing apparatus in a third embodiment.

FIG. 12 shows an exemplary operation screen 1201 displayed on a liquid crystal panel 902 in FIG. 9, and the operation screen 1201 is displayed by a user pressing down a menu button 907 or a four-direction button 903 in FIG. 9.

Selection buttons 1202, 1203, and 1204 allow the user to designate a photographer X, a photographer Y, or a photographer Z, and the names of the people who have been registered in advance as photographers are displayed. By pressing down the four-direction button 903, the user can switch the photographer to be selected.

Upon a return (cancel) button 1205 being selected by the user, a set state configured on the operation screen 1201 is deemed to be invalid and this set state is not reflected.

Upon an OK (set) button 1206 being selected by the user, a set state configured on the operation screen 1201 is deemed to be valid and this state is reflected in later processing.

When a certain person uses the image capturing apparatus, the photographer can be identified from among candidates displayed on the operation screen 1201 by initially operating the menu button 907 to display the operation screen 1201 and thereafter operating the four-direction button 903 and the OK button 1206.

Other configurations of the present embodiment are similar to those of the first embodiment, and the description thereof will be omitted.

Fourth Embodiment

Next, facial authentication processing performed by an image capturing apparatus with respect to a photographer in a fourth embodiment will be described.

In the present embodiment, in the case where a photographer cannot be identified in the above-described embodiments, facial authentication processing is performed with respect to the photographer using the face of an object detected in an image shot by the main camera 106. Here, "the case where a photographer cannot be identified" refers to, for example, the case where a self-timer is used to perform shooting or the case of temporarily having another person press the shutter button, and a situation where the photographer himself/herself is included in the main camera image is envisioned.

Figure 13:
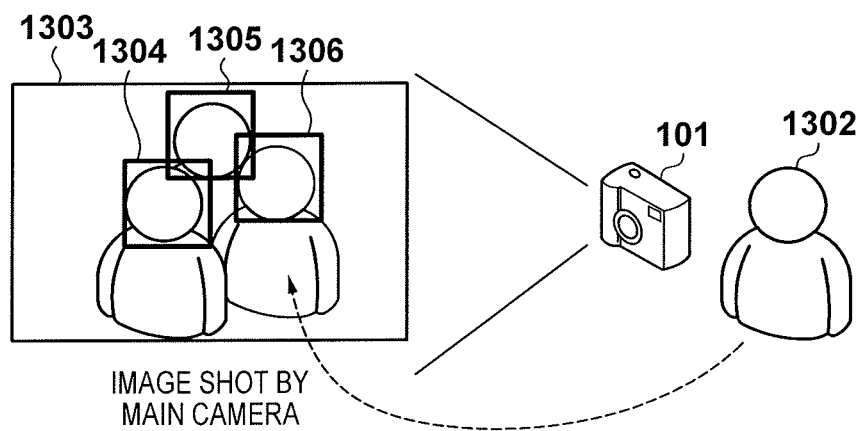
FIG. 13 is a diagram illustrating facial authentication processing performed by an image capturing apparatus with respect to a photographer in a fourth embodiment.

FIG. 13 is a diagram for illustrating facial authentication processing with respect to the photographer in the fourth embodiment.

In FIG. 13, in self-timer shooting, a photographer 1302 configures settings of the self-timer on the image capturing apparatus 101, thereafter moves onto the main camera side, and appears in an image 1303 together with other objects 1304 to 1306. In this case, since no one exists on the sub-camera side at the moment of shutter release, the photographer cannot be identified using an image shot by the sub-camera 107 as in the first embodiment, for example. For this reason, authentication of the photographer is performed based on people recognized in the main camera image.

Figure 14:
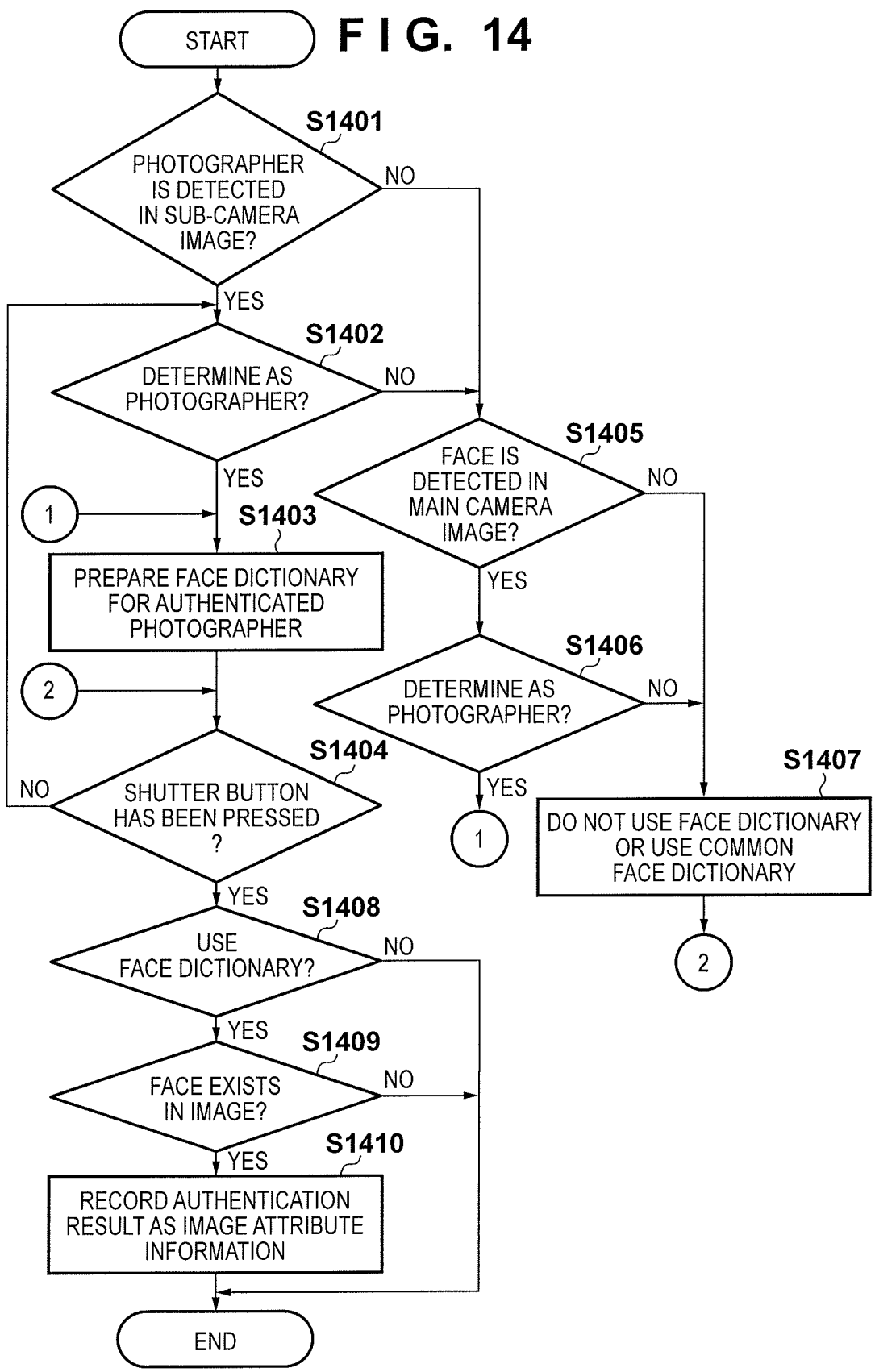
FIG. 14 is a flowchart showing facial authentication processing performed by the image capturing apparatus with respect to a photographer in the fourth embodiment.

FIG. 14 is a flowchart showing facial authentication processing performed by the image capturing apparatus with respect to the photographer in the fourth embodiment.

In FIG. 14, in step S1401, the CPU 102 shoots an image using the sub-camera 107 and determines whether or not a face area exists in the sub-camera image with the face detection processing unit 204. If it is determined in step S1401 that a face area exists, the CPU 102 advances the processing to step S1402, and if it is determined that a face area does not exist, the CPU 102 advances the processing to step S1405.

In step S1402, the CPU 102 causes the facial authentication processing unit 205 to reference the face dictionary DB 206 and thereby determines whether or not the photographer has been identified. If the photographer has been identified in step S1402, the CPU 102 advances the processing to step S1403, and if the photographer cannot be identified since the face recognized in step S1401 is not registered in the face dictionary DB 206, the CPU 102 advances the processing to step S1405.

The processing in step S1403 and subsequent steps is the same as that in step S502 and subsequent steps in FIG. 5.

On the other hand, in step S1405, the CPU 102 shoots an image using the main camera 106, and determines whether or not a face area exists in the main camera image with the face detection processing unit 204. If it is determined in step S1405 that a face area exists, the CPU 102 advances the processing to step S1406, and if it is determined that a face area does not exist, the CPU 102 advances the processing to step S1407.

In step S1406, the CPU 102 causes the facial authentication processing unit 205 to reference the face dictionary DB 206 and thereby determines whether or not the photographer has been identified from the face area recognized in step S1405. If the photographer has been identified in step S1406, the CPU 102 advances the processing to step S1403, and if the photographer cannot be identified due to the face recognized in step S1405 not being registered in the face dictionary DB 206, the CPU 102 advances the processing to step S1407.

The processing in step S1407 is similar to that in step S503 in FIG. 5.

Although the present embodiment has described an example in which authentication of the photographer is performed based on people recognized in the main camera image in the case where the photographer cannot be identified in the sub-camera image, a person who has been immediately previously authenticated as the photographer can also be successively deemed to be the photographer, as will be described below.

Figure 15:
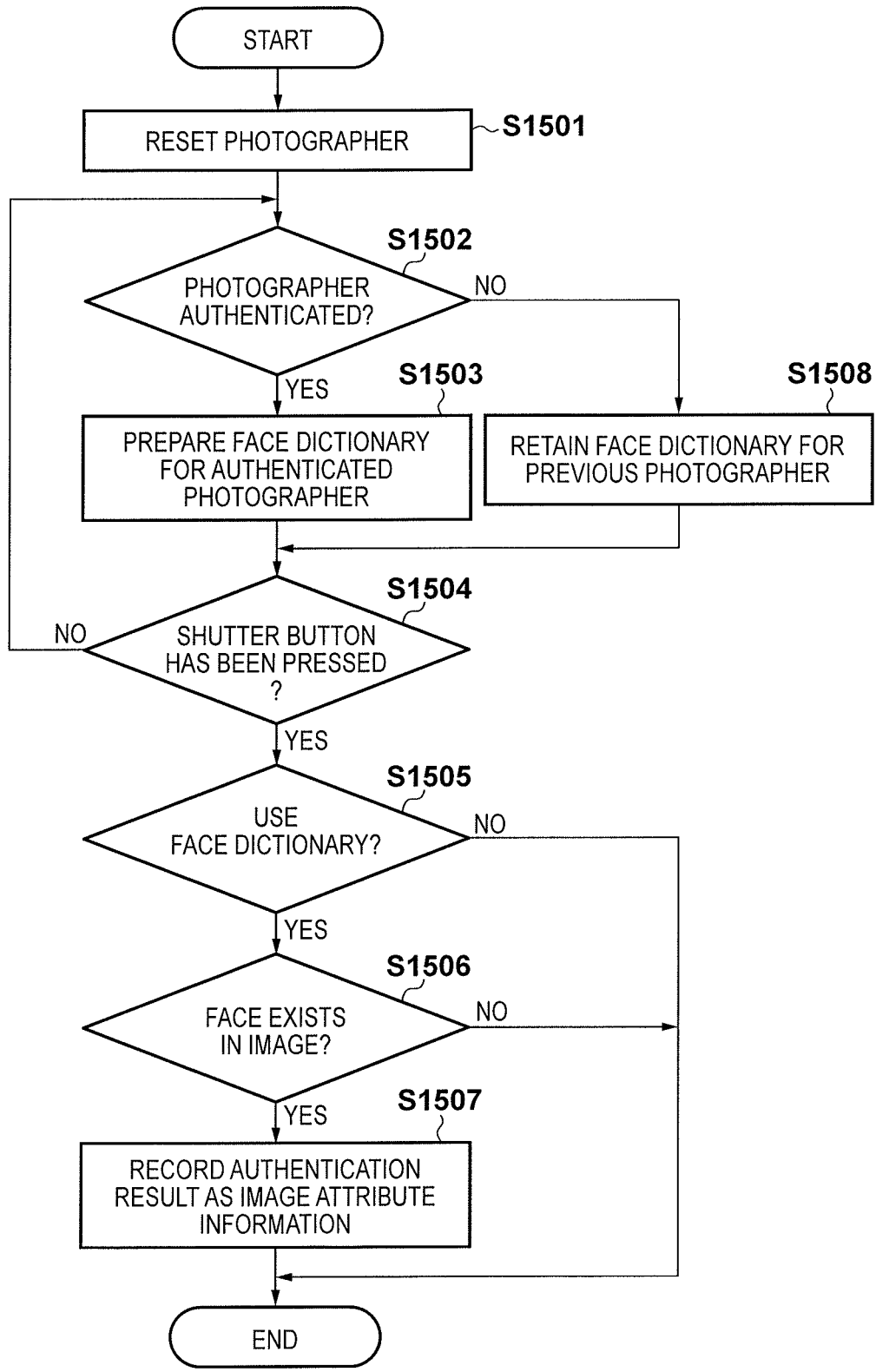
FIG. 15 is a flowchart showing facial authentication processing performed by the image capturing apparatus with respect to a photographer in the fourth embodiment.

FIG. 15 is a flowchart showing processing by which a person who has been immediately previously authenticated as the photographer is deemed to be the photographer in the case where the photographer cannot be identified at the time of shooting, in the image capturing apparatus in the fourth embodiment.

In FIG. 15, in step S1501, the CPU 102 resets the result of the previously performed facial authentication processing with respect to the photographer. Specifically, the name and the face dictionary data of the photographer that have been loaded into the memory 108 are initialized. Initialization processing is performed at the time when there is thought to be a change in photographer, such as when a power switch is turned on or when initial settings are configured, and can be omitted in the case where the same photographer successively shoots a plurality of images.

In step S1502, the CPU 102 performs facial authentication processing with respect to the photographer using any of the above-described methods, advances the processing to step S1503 if the photographer is authenticated, and advances the processing to step S1504 if not.

In step S1503, the face dictionary for the photographer identified in step S1502 is loaded from the face dictionary DB 206 into the memory 108, and the CPU 102 can reference the face dictionary using the facial authentication processing unit 205.

On the other hand, in step S1508, since the photographer was not authenticated in step S1502, the CPU 102 loads the face dictionary for the photographer who was authenticated in the previous processing into the memory 108. Thus, the face dictionary for the photographer at the time when the facial authentication was previously performed is retained unless authentication of a new photographer is performed.

The processing in step S1504 and subsequent steps is the same as that in step S504 and subsequent steps in FIG. 5.

As described above, if the photographer is not identified in step S1502, the CPU 102 advances the processing to step S1504 without changing the current state and prepares for shooting. That is to say, the state that was set for the immediately previously authenticated photographer will be maintained unless a new photographer is, identified. Thus, the immediately previously authenticated photographer can be used as the photographer at the time of shooting.

Fifth Embodiment

Next, processing for registering a face dictionary performed by an image capturing apparatus in a fifth embodiment will be described.

In the present embodiment, processing for registering different names with respect to the same object in face dictionaries for respective photographers is performed.

As described with reference to FIG. 4, in the face dictionary in the present embodiment, the name of an object having a common feature amount 403 that is managed with the same ID 402 can be registered in the tables 405 to 407 prepared for the respective photographers. That is to say, names that differ depending on the photographer can be registered with respect to the same object in the face dictionary DB.

Therefore, a method by which a photographer registers a new object name in the face dictionary for that photographer will be described below.

FIG. 16 shows an exemplary operation screen 1601 displayed on a liquid crystal panel 902 in FIG. 9, and the operation screen 1601 is displayed by a user pressing down the menu button 907 or the four-direction button 903 in FIG. 9 when the above-described facial authentication processing is executed with respect to an object.

On the operation screen 1601, reference numeral 1602 denotes an object name input box, and if an object has already been registered, the name thereof is displayed in this box, and if not, the box is displayed in an empty state. The user can input a new or changed object name in the name input box 1602 such as a touch panel. Reference numeral 1603 denotes a return button, and upon this button being pressed, the input content in the name input box 1602 is discarded and the registration processing is cancelled. Reference numeral 1604 denotes an OK button, and upon this button being pressed, the input content in the name input box 1602 is reflected in the face dictionary for the photographer who is currently operating, and the registration processing can be ended.

Figure 17:
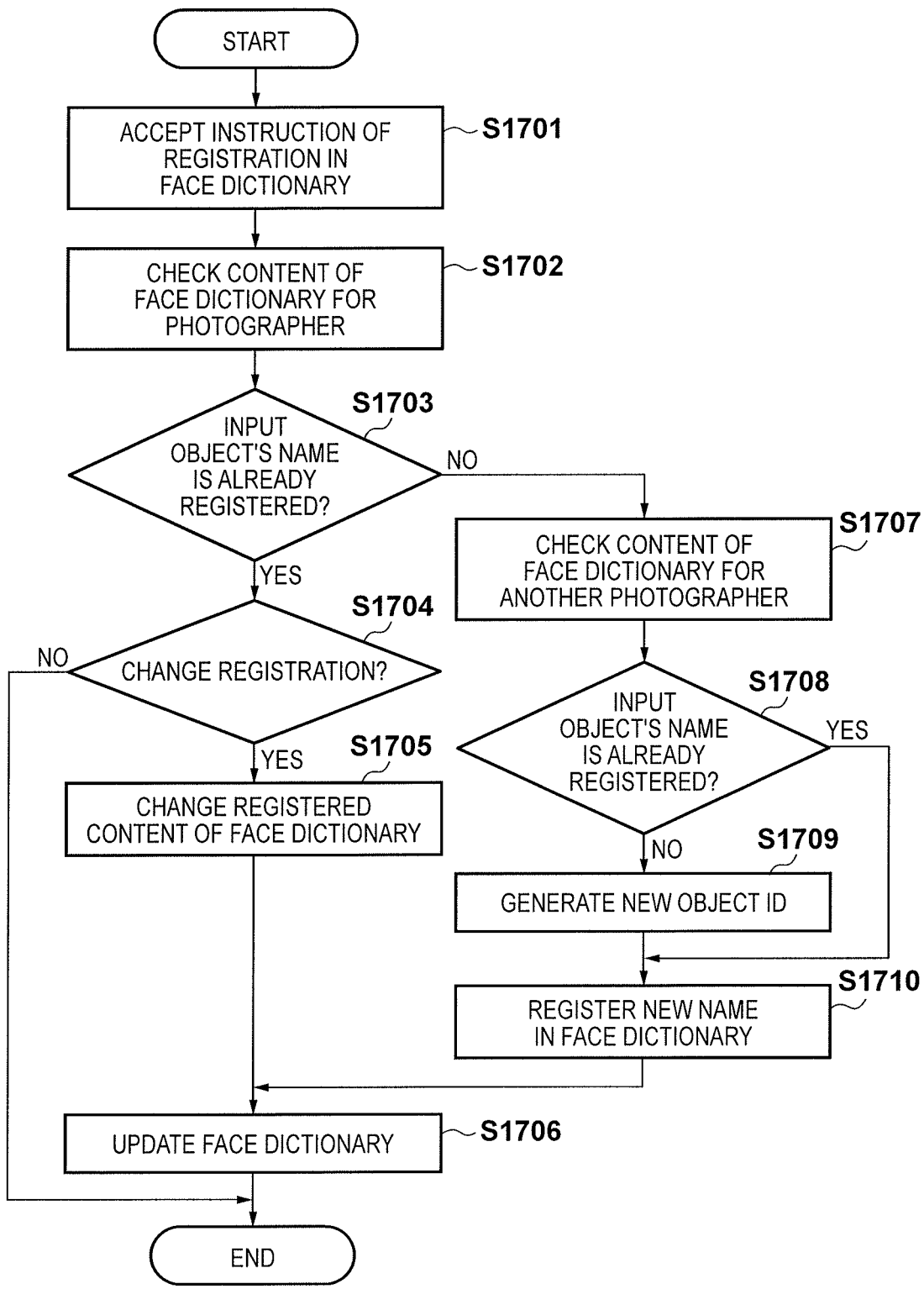
FIG. 17 is a flowchart showing processing in which a photographer registers his/her own information in a face dictionary in the image capturing apparatus in the fifth embodiment.

FIG. 17 is a flowchart showing processing in which a photographer registers the name of an object in the face dictionary for this photographer, performed by the image capturing apparatus in the fifth embodiment.

In FIG. 17, in step S1701, upon the CPU 102 confirming that the user has registered the name of an object in the name input box 1602 on the operation screen 1601 in FIG. 16 and the OK button 1604 has been pressed, the CPU 102 advances the processing to step S1702 and checks the content of the face dictionary for the photographer.

In step S1703, the CPU 102 determines whether or not the name that was input in the name input box 1602 has already been registered in the face dictionary for the photographer, advances the processing to step S1704 if the name has been registered, and advances the processing to step S1707 if not.

In step S1704, the CPU 102 displays information such as characters for prompting the user to change the registered name on the operation screen 1601. In this case, the name that has already been registered is displayed in the name input box 1602 on the operation screen 1601, and can be changed by means of editing by the user.

In step S1705, the CPU 102 determines whether or not the content of the name input box 1602 has been changed, advances the processing to step S1706 if the content has been changed, and ends the processing if the existing content is to retain as-is due to the return button 1603 being pressed or for other reasons.

On the other hand, if the name has not been registered in the face dictionary for the photographer in step S1703, the CPU 102 advances the processing to step S1707 and checks the content of the face dictionaries for other photographers.

In step S1708, if the name has not been registered in the face dictionaries for other photographers either, the CPU 102 advances the processing to step S1709, and advances the processing to step S1710 if it has been registered.

In step S1709, the CPU 102 generates a new ID 402 for the input name, and in step S1710, the CPU 102 adds the new ID in the face dictionary DB 401, registers the input name in the name input box 1602 on the operation screen 1601, and ends the processing.

If the name has been registered in a face dictionary for another photographer in step S1708, the CPU 102 omits generation of the ID 402 in step S1709, newly registers the name that was input in the name input box 1602 in the face dictionary for the photographer in step S1710, and ends the processing.

As described above, according to the present embodiment, different names can be individually registered with respect to the same object in the face dictionaries for the respective photographers.

Sixth Embodiment

Next, processing for copying a face dictionary performed by an image capturing apparatus in a sixth embodiment will be described.

In the present embodiment, processing for copying a face dictionary for a photographer to another device such that the face dictionary is available in the other device is performed.

Figure 18A:
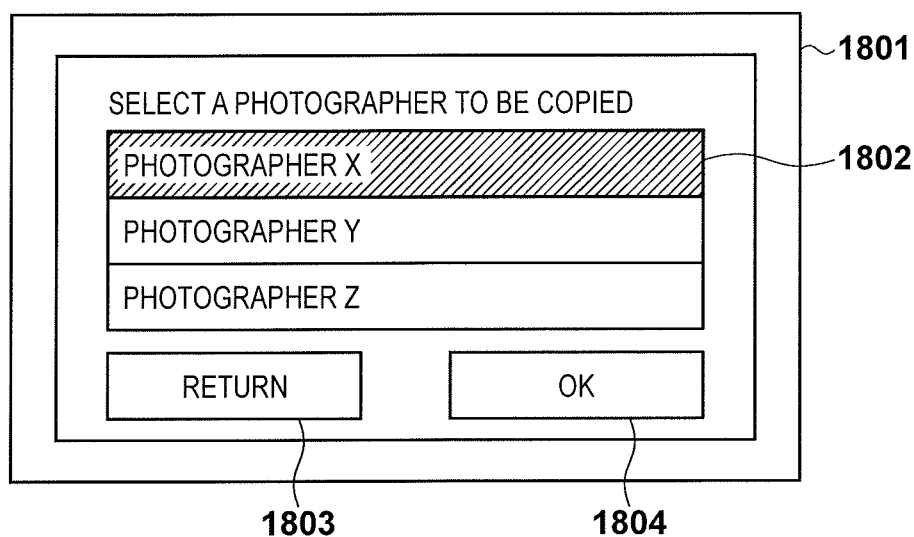
FIGS. 18A and 18B are diagrams showing exemplary UI screens for allowing a user to copy an existing face dictionary to another device with an image capturing apparatus in a sixth embodiment.
Figure 18B:
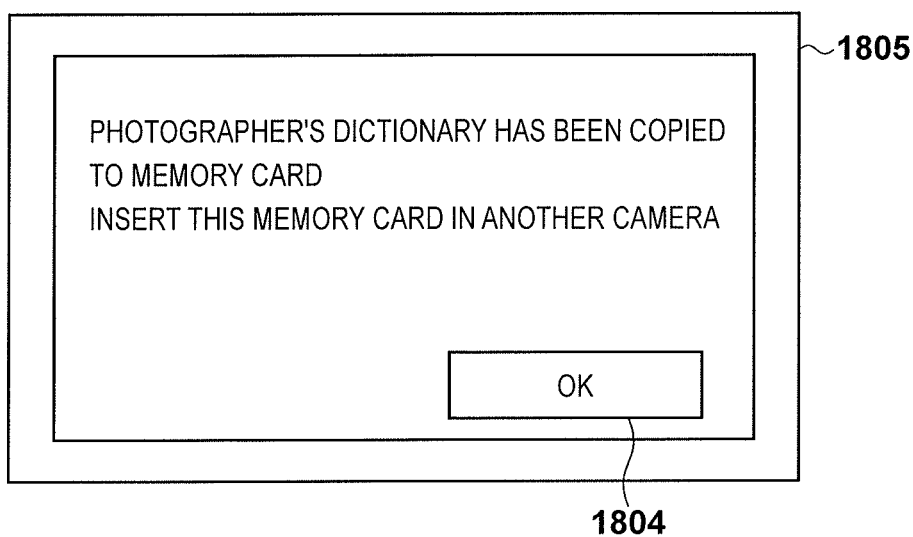
Figure 19A:
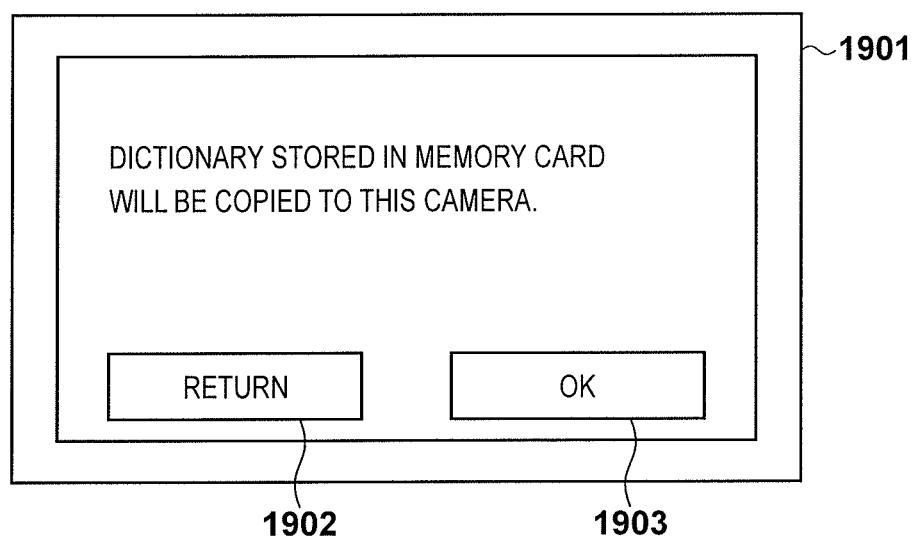
FIGS. 19A and 19B are diagrams showing exemplary UI screens of a copy destination image capturing apparatus in the case where a user copies an existing face dictionary to another device with the image capturing apparatus in the sixth embodiment.
Figure 19B:
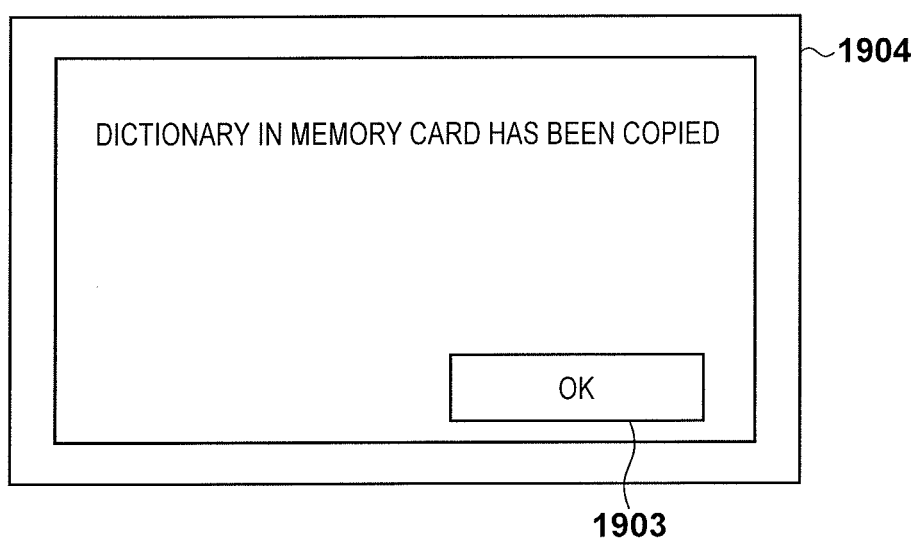

FIGS. 18A and 18B show exemplary operation screens displayed in a display unit of a copy source device, and FIGS. 19A and 19B show exemplary operation screens displayed in a display unit of a copy destination device. Although the present embodiment will describe a method for copying a face dictionary in the copy source device using a memory card such as an SD (registered trademark) card as a recording medium from/to which data can be read/written also by the copy destination device, the face dictionary data may alternatively be transferred from the copy source to the copy destination using other communication module including wired and wireless communication functions.

An operation screen 1801 in FIG. 18A is displayed on a liquid crystal panel 902 in FIG. 9 upon a user designating a copy of a face dictionary with a menu button 907 or a four-direction button 903 in FIG. 9. Reference numeral 1802 denotes a list of the face dictionaries for the respective photographers managed in the copy source device, and the user can select the face dictionary for a desired photographer. Reference numeral 1803 denotes a return button for interrupting the current operation, and reference numeral 1804 denotes an OK button for reflecting the operations performed thus far.

As shown in FIG. 18A, upon the user selecting the photographer X, which is denoted by reference numeral 1802, on the operation screen 1801 and touching the OK button 1804, the face dictionary data for the selected photographer X is copied to a memory card inserted in a card slot, via a memory interface 109. After copying is finished, the screen is switched to an operation screen 1805 shown in FIG. 18B, and information such as a message for prompting the user to insert the memory card in the copy destination device is displayed. The operation on the copy source device is finished by the user touching the OK button 1806.

An operation screen 1901 in FIG. 19A is displayed when the user inserts the memory card in the copy destination device. Information such as a message for prompting the user to select whether or not to copy the face dictionary data stored in the memory card is displayed on the operation screen 1901. Copying of the face dictionary data to the copy destination device is completed by the user touching an OK button 1903, whereas copying is not performed if the user touches a return button 1902. When copying is complete, the screen is switched to an operation screen 1904 shown in FIG. 19B, information such as a message for notifying the user that copying of the face dictionary data is complete is displayed, and the operation on the copy destination device is finished by the user touching the OK button 1903.

FIG. 20 shows an exemplary configuration of the face dictionary data that is copied from the copy source device to the memory card in the sixth embodiment.

In FIG. 20, reference numeral 2001 denotes the face dictionary data for the photographer X selected on the operation screen 1801. Reference numeral 2002 denotes ID numbers of objects, reference numeral 2003 denotes feature amounts of the faces of the objects, and reference numeral 2004 denotes units of people (objects) for the selected photographer based on the association between the feature amounts of the faces of the objects and the names registered in the face dictionary.

The face dictionary data 2001 for the selected photographer X is constituted by extracting pieces of the information for the photographer X from the face dictionary DB 401 shown in FIG. 4, and the face dictionary data of unselected photographers is excluded.

Figure 21:
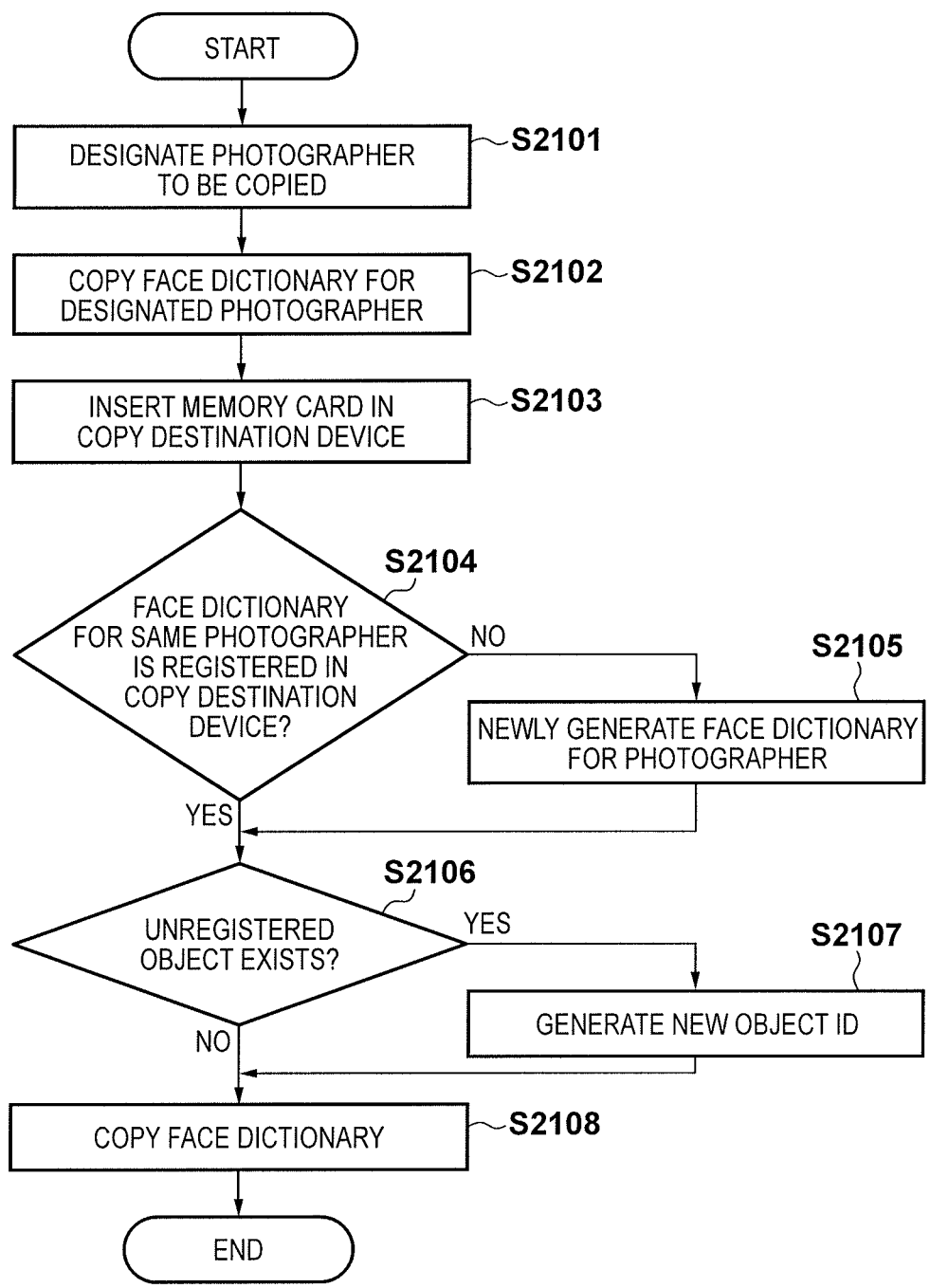
FIG. 21 is a flowchart showing processing for copying a face dictionary individually for each photographer in the image capturing apparatus in the sixth embodiment.

FIG. 21 is a flowchart showing processing for copying the face dictionary performed by the image capturing apparatus in the sixth embodiment.

In FIG. 21, upon the user selecting a photographer in the copy source on the operation screen 1801 in FIG. 18A in step S2101, the CPU 102 copies the name of the selected photographer and the face dictionary data 2001 into the memory card in step S2102.

In step S2103, the memory card to which the face dictionary data has been copied is inserted in the copy destination device, and upon an instruction to write the face dictionary data onto the copy destination device being given on the operation screen 1901, it is determined in step S2104 whether or not the face dictionary data of the same photographer has been registered in the face dictionary DB 401 in the copy destination device. If the face dictionary data for the same photographer has been registered, the processing proceeds to step S2106, and if not, the processing proceeds to step S2105.

In step S2105, in the copy destination device, the face dictionary of the unregistered photographer is newly generated in the face dictionary DB 401.

In step S2106, in the copy destination device, it is determined whether or not the feature amount of the face of an object that is not registered in the face dictionary DB in the copy destination device exists in the feature amounts 2003 of the faces of objects in the face dictionary data 2001 stored in the memory card. If no unregistered object exists, the processing proceeds to step S2108, and if an unregistered object exists, the processing proceeds to step S2107.

In step S2107, in the copy destination device, a new ID number is given to the unregistered object, and the feature amount of the face of this object is added to the face dictionary DB.

In step S2108, in the copy destination device, the face dictionary data stored in the memory card is copied.

As described above, according to the present embodiment, it is possible to copy only the face dictionary for the photographer selected by the user to another device so as to be available therein.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiments of the present invention, and by a method performed by the computer of the system or apparatus by, for example, reading out and executing the computer executable instructions from the storage medium to perform the functions of one or more of the above-described embodiments. The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blue-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-100705, filed May 10, 2013 which is hereby incorporated by reference herein in its entirety.

What is claimed is:

1. An image capturing apparatus, comprising:
  a first image capturing unit configured to capture an image of a photographer;
  a second image capturing unit configured to capture an image of a person other than the photographer;
  a storage unit configured to store a first dictionary corresponding to a first photographer and a second dictionary corresponding to a second photographer, wherein in the first dictionary and the second dictionary face feature information for authenticating a plurality of persons included in a captured image by the second image capturing unit and name information corresponding to an authenticated person are registered, and different name can be registered in each dictionary even if face feature information of the same person are registered in the first dictionary and the second dictionary;
  a recording unit configured to store image data generated by the second image capturing unit;
  a processor; and
  a memory configured to store at least one program executable by the processor, at least one program having instructions that, when the program is executed by the processor, cause the processor to:
  identify the photographer from the image captured by the first image capturing unit using facial recognition;
  select a dictionary corresponding to the identified photographer;
  authenticate one or more persons in the image captured by the second image capturing unit using the selected dictionary;
  display a frame so as to surround a face of a person in a through image captured by the second image capturing unit by using the face feature information of the plurality of persons stored in the selected dictionary, and
  record, as attribute information for the image data, face feature information and name information corresponding to the authenticated person that is included in the selected dictionary, in the recording unit.

2. The apparatus according to claim 1, wherein the program includes instructions that cause the processor to display the image data generated by the second image capturing unit,
  wherein the name information corresponding to the authenticated person that is included in the selected dictionary is displayed in the vicinity of an image.

3. The apparatus according to claim 2, wherein the program includes instructions that cause the processor to display a frame so as to surround a face of a person in the captured image by the second image capturing unit and to display a name of the person in the vicinity of the frame, based on the result of the authentication.

4. The apparatus according to claim 1, wherein the program includes instructions that cause the processor to read biological information of the photographer, and specify the photographer using the read biological information.

5. The apparatus according to claim 1, wherein if the photographer is not identified, the authentication is performed using the dictionary of a photographer who was identified in previous processing.

6. The apparatus according to claim 1, wherein if the photographer is not identified, the authentication is performed using the face feature information registered in the second dictionary.

7. The apparatus according to claim 1, wherein the selection is performed by designating the name of the photographer.

8. The apparatus according to claim 1, wherein the first or second dictionary can be copied to another device.

9. A control method of an image capturing apparatus, comprising:
  capturing an image of a photographer using a first image capturing unit;
  capturing an image of a person other than the photographer using a second image capturing unit;
  storing a first dictionary corresponding to a first photographer and a second dictionary corresponding to a second photographer, wherein in the first dictionary and the second dictionary face feature information for authenticating a plurality of persons included in a captured image by the second image capturing unit and name information corresponding to an authenticated person are registered, and different name can be registered in each dictionary even if face feature information of the same person are registered in the first dictionary and the second dictionary;
  storing image data generated by the second image capturing unit;
  identifying the photographer from the image captured by the first image capturing unit using face recognition;
  selecting a dictionary corresponding to the identified photographer;
  authenticating one or more persons in the image captured by the second image capturing unit using the selected dictionary;
  displaying a frame so as to surround a face of a person in a through image captured by the second image capturing unit by using the face feature information of the plurality of persons stored in the selected first or second dictionary, and
  recording, as attribute information for the image data, face feature information and name information corresponding to the authenticated person that is included in the selected dictionary.

10. A non-transitory computer-readable storage medium storing a program for causing a computer to execute a control method comprising:
  capturing an image of a photographer using a first image capturing unit;
  capturing an image of a person other than the photographer using a second image capturing unit;
  storing a first dictionary corresponding to a first photographer and a second dictionary corresponding to a second photographer, wherein in the first dictionary and the second dictionary face feature information for authenticating a plurality of persons included in a captured image by the second image capturing unit and name information corresponding to an authenticated person are registered, and different name can be registered in each dictionary even if face feature information of the same person are registered in the first dictionary and the second dictionary;

storing image data generated by the second image capturing unit;

identifying the photographer from the image captured by the first image capturing unit using face recognition;

selecting a dictionary corresponding to the identified photographer;

authenticating one or more persons in the image capture by the second image capturing unit using the selected dictionary;

displaying a frame so as to surround a face of a person in a through image captured by the second image capturing unit by using the face feature information of the plurality of persons stored in the selected first or second dictionary, and recording, as attribute information for the image data, face feature information and name information corresponding to the authenticated person that is included in the selected dictionary.

* * * * *